United States Patent [19]

Jarrett, Jr.

[11] Patent Number: 4,993,830
[45] Date of Patent: Feb. 19, 1991

[54] DEPTH AND DISTANCE MEASURING SYSTEM

[75] Inventor: Harold M. Jarrett, Jr., Duluth, Ga.

[73] Assignee: Systronics, Incorporated, Norcross, Ga.

[21] Appl. No.: 453,402

[22] Filed: Dec. 18, 1989

[51] Int. Cl.$^5$ .............................................. G01C 3/08
[52] U.S. Cl. ........................................ 356/4; 354/163
[58] Field of Search ................. 356/1, 4; 354/162, 163

[56] References Cited

U.S. PATENT DOCUMENTS

| | | | |
|---|---|---|---|
| 4,371,261 | 2/1983 | Tsuji | 356/4 X |
| 4,579,450 | 4/1986 | Nagaoka et al. | 356/4 |
| 4,647,193 | 4/1987 | Rosenfeld | 356/4 |
| 4,787,739 | 11/1988 | Gregory | 356/4 |

Primary Examiner—Mark Hellner
Attorney, Agent, or Firm—Kenneth W. Float

[57] ABSTRACT

Apparatus for determining the relative distance or depth to an object. A light source projects light at an object whose distance is to be determined. A lenticular prismatic screen responds to light reflected from the object and generates two distinct images thereof. Imaging optics focuses the two images generated by the lenticular prismatic screen onto a sensor which detects and digitizes the images. A computer is coupled to the sensor that determines the separation between the two images, which separation is indicative of the distance to or depth of the object. The computer may also compute the centroid of each of the images to more accurately determine the separation between them, and hence the distance to the object. The lenticular screen may use prismatic surfaces that are essentially equilateral triangles, or constant angle prisms across the material. Alternatively, the screen may comprise a cylindrical Fresnel lens whose prism angle continually varies as a function of the off axis distance from the center of the screen. Furthermore, a screen having different vertex angles may be formed to create custom measurement results.

6 Claims, 4 Drawing Sheets

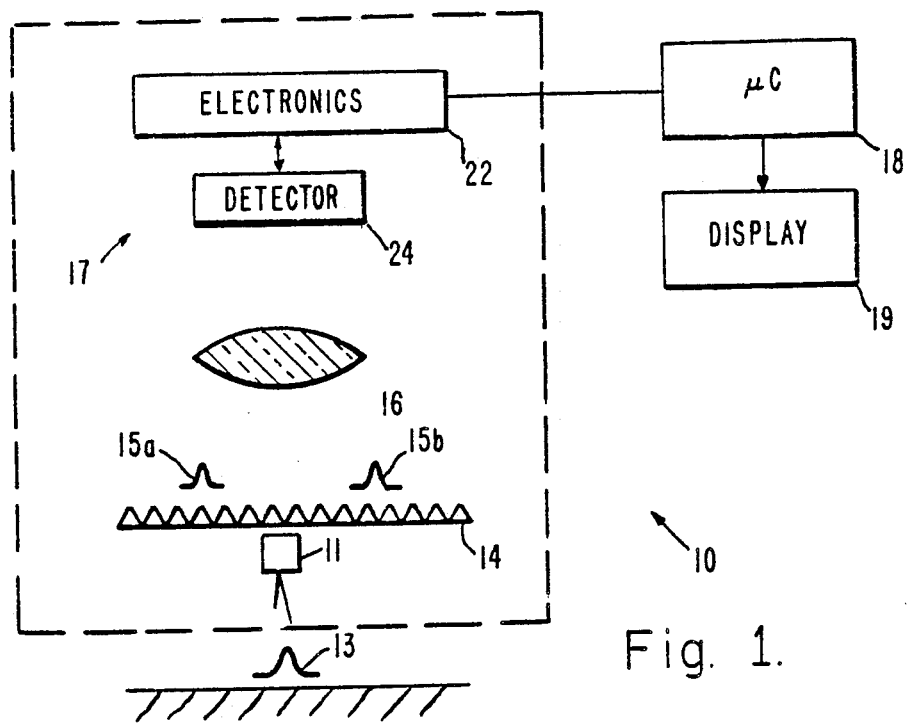
Fig. 1.
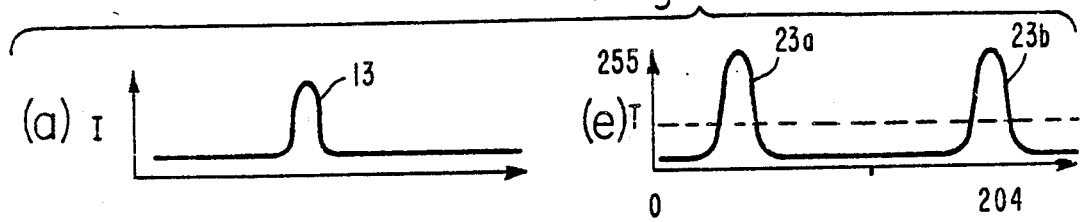
Fig. 2.
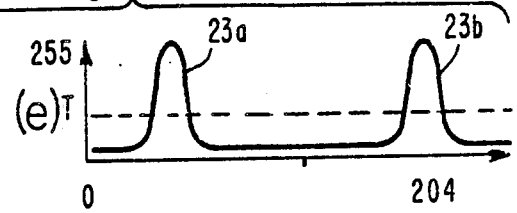
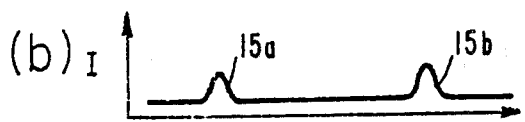
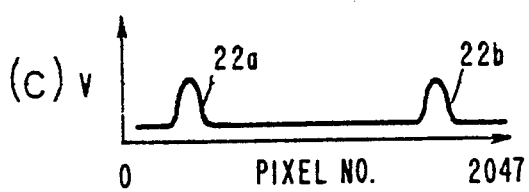
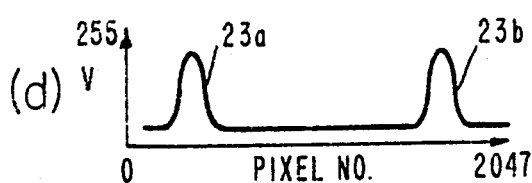

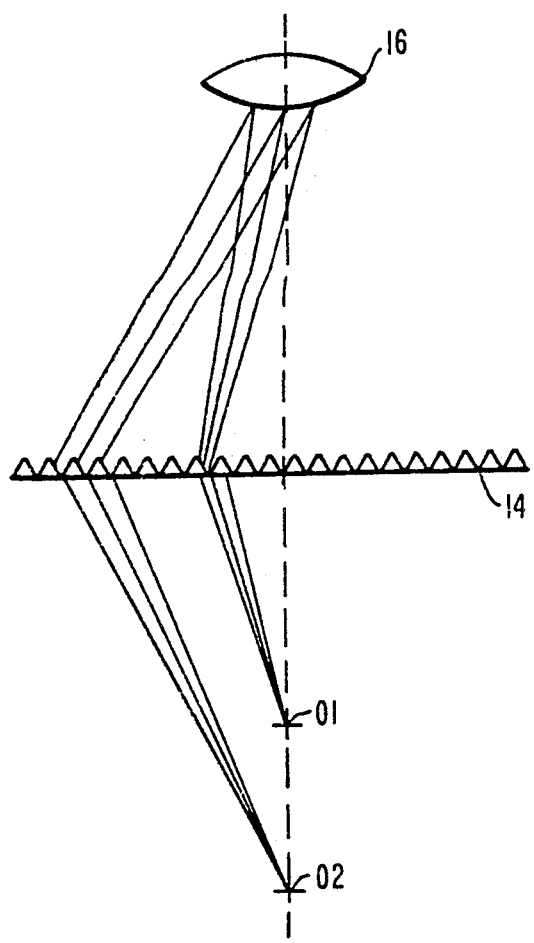
Fig. 4.
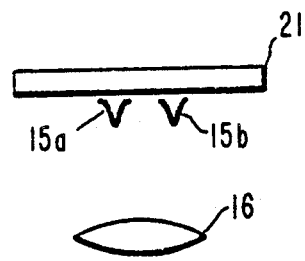
Fig. 5.
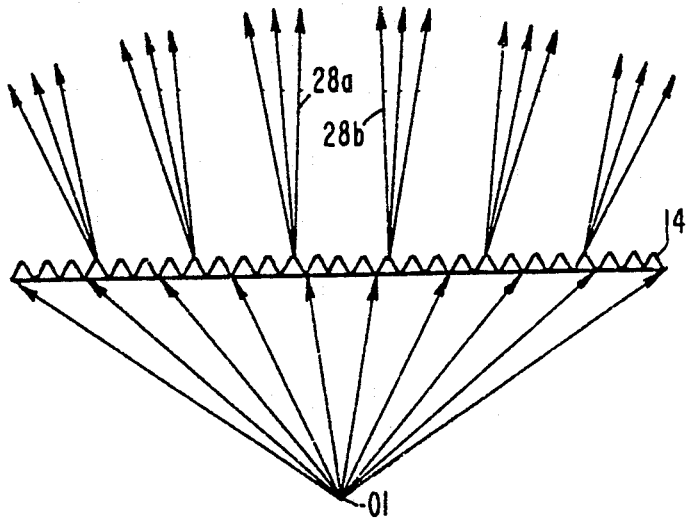

DEPTH AND DISTANCE MEASURING SYSTEM

BACKGROUND

The present invention relates generally to systems for determining the depth and distance to objects, and more particularly to such systems that employ optical apparatus and lenticular screens to make the measurements.

There are numerous techniques of measuring the distance to an object, including parallax rangefinders that employ optical or manual systems wherein an operator dials two images into alignment and reads the distance thereto from a dial, for example. However, such rangefinders are only useful in determining relatively long distances, on the order of 10 to 1000 meters. Electronic triangulation systems have been designed that include a laser light source and a linear spot sensor. These systems determine the shift in spot location relative to a reference to determine the distance to a remote object. Such electronic triangulation systems are able to measure distances on the order of about one half inch. Laser rangefinders have been developed for military uses such as laser guidance and tracking systems, and the like. Also, sonar rangefinders have been developed by Polaroid and Texas Instruments, for example, for commercial use in cameras. However, such conventional systems are typically not designed to measure very close distances, on the order of 3 feet to 30 feet.

Therefore, it is a goal of the present invention to provide for a system that determines the distance to or depth to an object. It is also a goal of the present invention to provide for a system that measures relatively short distances to or depth of an object, on the order of 0 to 10 inches with high resolution.

SUMMARY OF THE INVENTION

The present invention provides for apparatus that determines the distance to, or depth to, an object. The present invention comprises a light source that projects light at an object whose distance is to be determined. A lenticular prismatic screen adapted to respond to light reflected from the object and generate two distinct images thereof is disposed to receive reflected light from the object. Alternatively, a plurality of prisms may be employed to generate the two distinct images. An imaging arrangement is provided for focusing the two distinct images generated by the lenticular prismatic screen onto a sensor that detects the images focused thereon. A computer is coupled to the sensor that determines the separation between the two distinct images, which separation is indicative of the distance to or depth of the object. The computer may also comprise means for computing the centroid of each of the images to more accurately determine the separation between them, and hence the distance to the object. The lenticular screen may use prismatic surfaces that are essentially equilateral triangles, or constant angle prisms across the material. Alternatively, the screen may comprise a cylindrical Fresnel lens whose prism angle continually varies as a function of the off axis distance from the center of the screen. Furthermore, a screen having different vertex angles may be formed to create custom measurement results.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 illustrates a system for determining the distance to or depth to an object made in accordance with the principles of the present invention;

FIGS. 2a-2e are a set of graphs illustrating the processing of signals in the system of FIG. 1;

FIG. 4 illustrates the imaging of two objects having different distances in accordance with the principles of the present invention FIG. 5 illustrates the imaging of two spots by means of the lenticular screen of the system of FIG. 1.

DETAILED DESCRIPTION

Figure 3:
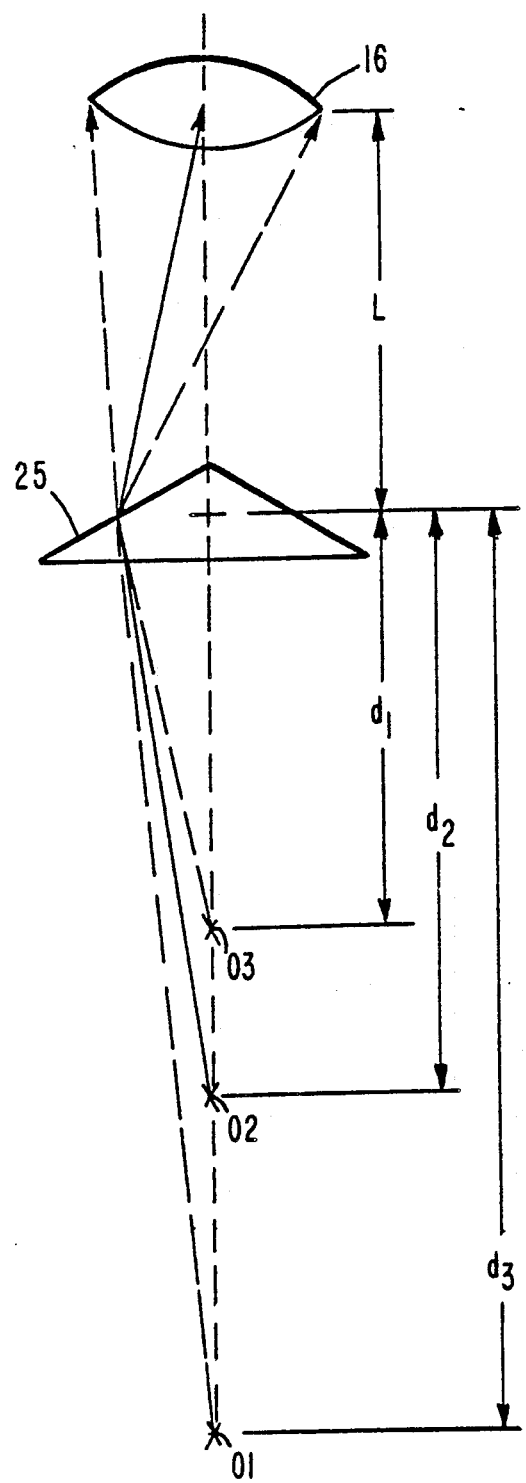
FIG. 3 is an illustration illustrating the operation of a single prism of the prismatic screen employed in the system of FIG. 1.

Referring to FIG. 1, it illustrates a system 10 for determining the distance to or depth to an object in accordance with the principles of the present invention. The system 10 comprises a light source 11 for projecting light, represented by a light spot 13, at an object whose distance from the system 10 is to be determined. The light source 11 may be a conventional light source, such as model 3200 laser diode manufactured by Nippon Electric Company (NEC), for example. The light spot 13 is projected at the object such that it impinges on a surface thereof. The light spot 13 is reflected or backscattered from the object toward the system 10. A lenticular prismatic screen 14 is disposed along an optical path of the system 10 and is adapted to respond to the light reflected from the object and generate two distinct images thereof. The two images are indicated by two light pulses 15a, 15b. The lenticular prismatic screen 14 is a molded plastic material, for example, such as light control film manufactured by Minnesota Mining and Manufacturing Company (3M), for example, having prismatic surfaces formed on one side thereof.

Imaging optics, represented by lens 16, is disposed along the optical path and is adapted to focus the two images generated by the lenticular prismatic screen onto a sensor 17. The sensor 17 is adapted to detect the images focused by the imaging optics 16. The sensor 17 is comprised of a detector array 21, and detector electronics 22 which is adapted to control and digitize the output of the detector 21. The detector 21, and detector electronics 22 are conventional components, such as model VA799 manufactured by NEC, and model RL512G manufactured by Reticon EG+G, for example. A computer 18 is coupled to the sensor 17, and in particular the detector electronics 22, and is adapted to determine the separation between the two images transmitted by the lenticular prismatic screen 14, which separation is indicative of the distance to the object. The computer 18 is coupled to a display 19 adapted to display distance and depth information generated by the computer 18. The computer may be a model SB100 manufactured by Systronics, Inc. and the display may be a model PS2-30 manufactured by International Business Machines, Inc. (IBM), for example.

FIGS. 2a-2e are a set of graphs illustrating the processing of signals in the system 10 of FIG. 1. FIG. 2a shows the light pulse 13 projected by the light source 11 in terms of intensity versus angle. FIG. 2b shows the reflected pulses 15a, 15b imaged by the lenticular prismatic screen 14 in terms of intensity versus angle. FIG. 2c illustrates output voltage versus pixel number representative of the analog output of the detector 21 (analog pulses 22a, 22b). FIG. 2d illustrates digitized output voltage versus pixel number representative of the digitized output of the detector electronics 22 (digitized pulses 23a, 23b). FIG. 2e illustrates the processing of the digitized output voltage from the detector electronics 22 (digitized pulses 23a, 23b) performed in the computer 18. This processing will be described in more detail with reference to FIG. 6 below.

FIG. 3 is an illustration illustrating the operation of a single prism 25 of the lenticular prismatic screen 14 employed in the system 10 of FIG. 1. FIG. 3 illustrates that rays incident upon the prism 25 from objects O1, O2, O3 located at different distances L1, L2, L3 will be transmitted at different incident angles with respect to the imaging optics 16, and will hence be imaged on the detector by the imaging optics 16 at a different position relative to the optical axis, or not be imaged thereby, as the case may be. This will be discussed in more detail below with reference to FIG. 4.

FIG. 4 illustrates the imaging of two objects O1, O2 having different distances by means of the lenticular prismatic screen 14. It is to be understood that the image located on the left side of the optical axis is shown in this figure for the purposes of illustration. As shown in FIG. 4, and in a manner similar to that described with reference to FIG. 3, the light reflected from each object O1, O2, since they are at different distances from the system 10, will be refracted by the lenticular prismatic screen 14 by different portions thereof which are a function of the distance of the objects O1, O2. There is a one-to-one correspondence between the distance that an object O1, O2 is from the system 10 and which prism, or prisms, refract light therefrom into the imaging optics 16 and onto the detector 21. Accordingly, the distance of an object O1, O2 is uniquely imaged by the system at a particular point on the detector 21.

FIG. 5 illustrates the imaging of two light pulses 15a, 15b from a single object by means of the lenticular screen 14 of the system 10 of FIG. 1. As is shown in FIG. 5, the object O1 reflects light rays at substantially all angles and these rays are transmitted by the lenticular prismatic screen 14 at a corresponding plurality of angles. Only a small portion of the rays are imaged by the imaging optics 16 and focused onto the detector 21, thus creating two images of the object O1. In particular, a bundle of rays on each side of the optical axis of the system 10 is focused onto the detector 21 to create the two light pulses 15a, 15b shown in FIG. 5. The physical separation of these two light pulses 15a, 15b is determinative of the distance to the object O1. The processing of the two light pulses 15a, 15b will be discussed below with reference to FIG. 6.

Figure 6A:
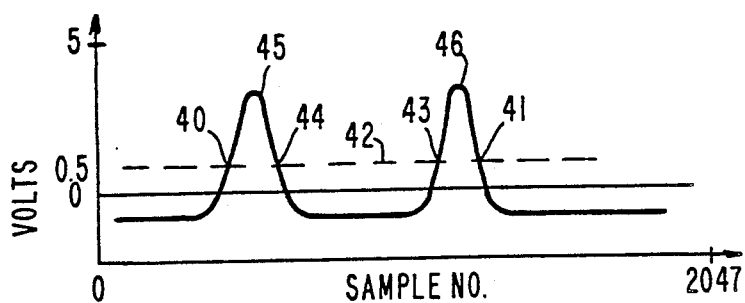
FIGS. 6a and 6b illustrates the processing of signals to determine the distance to of depth of an object in accordance with the principles of the present invention.
Figure 6B:
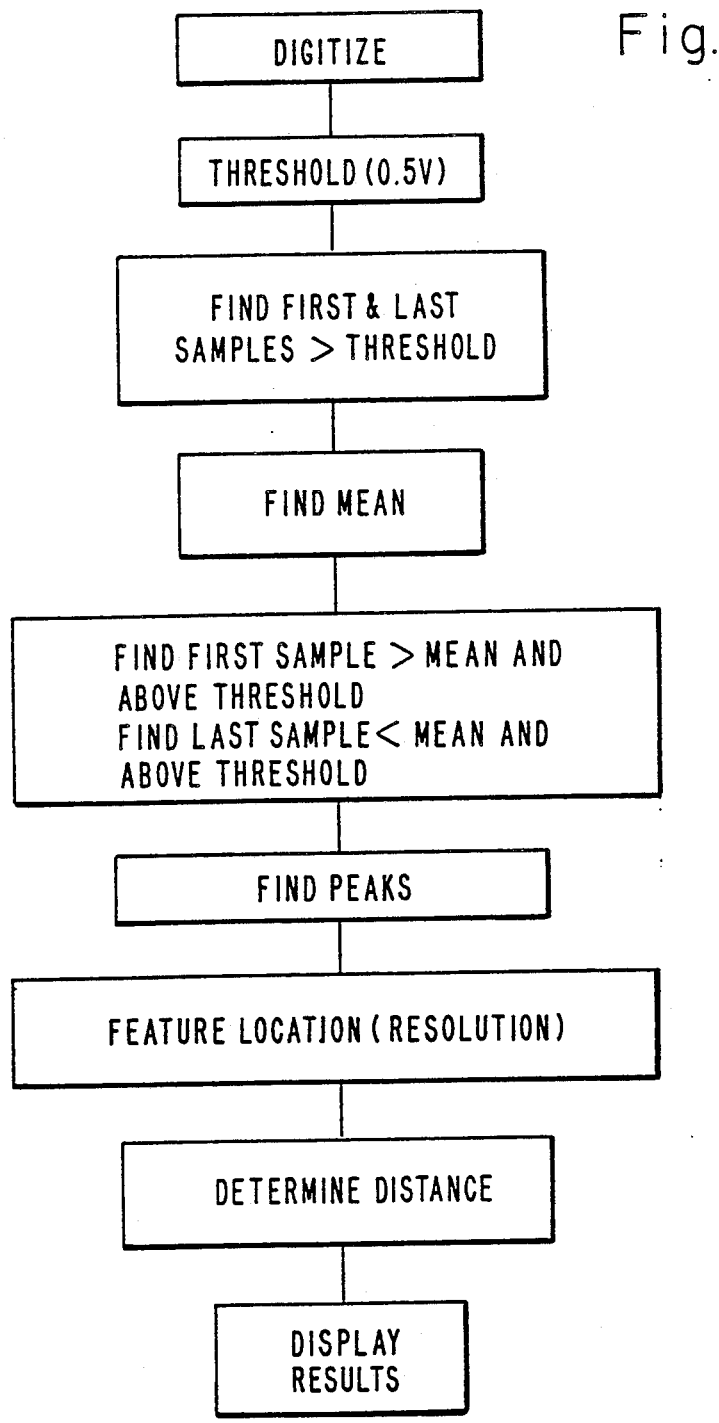

In order to better understand how the distance determination is made, reference is made to FIG. 6, comprising FIGS. 6a and 6b, which illustrate the method of determining the distance to an object employed in the system 10 described above. FIG. 6a shows a graph of reflected energy versus sample from the detector electronics 22. FIG. 6a shows two pulses imaged by the lenticular prismatic screen 14 onto the detector 21. Referring to FIG. 6b, the reflected energy is first digitized in an analog to digital converter (not shown) and stored in a memory (not shown) of the computer 18 wherein the data are processed. A threshold level (T) is set, which may be 0.5 volts for a 5 volt peak-to-peak input signal, for example. The first and last samples 40, 41 of the distribution that are above the threshold are found. The mean 42 of the distribution is then determined. The first value 43 that is greater than the threshold value and between the mean value 42 and last sample 41 is determined. The last value 44 that is greater than the threshold value and between the mean value 42 and first sample 40 is determined. The two peaks 45, 46 of the distribution are then determined using a conventional peak detection algorithm such as is described in *Digital Image Processing* by W. K. Pratt, for example. In addition, various features associated with the two peaks 45, 46 may be determined using centroid, matched filter, or best fit computations to improve the resolution of the pulse separation determination. Finally, the distance between peaks 45, 46 is determined to indicate the distance to or depth of the object O1. This value, including the graphic distribution are then displayed on the display 19.

The lenticular prismatic screen 14 may use prismatic surfaces that are essentially equilateral triangles, or constant angle prisms across the material. Alternatively, the lenticular prismatic screen 14 may comprise a cylindrical Fresnel lens whose prism angle continually varies as a function of the off axis distance from the center of the screen 14. Furthermore, a lenticular prismatic screen 14 having different vertex angles may be formed to create custom measurement results.

Thus there has been described a new and improved system that determines the distance to and depth to a material or body. The present invention provides for a system that is capable of measuring relatively short distances to or depth of an object, on the order of 1 inch to several feet.

It is to be understood that the above-described embodiment is merely illustrative of one of the many specific embodiments which represent applications of the principles of the present invention. Clearly, numerous and other arrangements can be readily devised by those skilled in the art without departing from the scope of the invention.

What is claimed is:

1. Apparatus for determining the relative distance to an object, comprising:
   a light source for projecting light at an object whose distance is to be determined;
   a lenticular prismatic screen adapted to respond to light reflected from the object and generate two distinct images thereof;
   imaging means for focusing the two distinct images generated by the lenticular prismatic screen;
   sensor means for detecting the images focused by the imaging means and for providing output signals indicative thereof; and
   computing means for processing the output signals from the sensor means and determining the separation between the two distinct images generated by the lenticular prismatic screen in response thereto, which separation is indicative of the distance to the object.

2. The apparatus of claim 1 wherein the computing means comprises means for computing the centroid of each of the two distinct images to determine the separation between them, and hence the distance to the object.

3. Apparatus for determining the relative distance to an object, comprising:

a light source for projecting light at an object whose distance is to be determined;

a lenticular prismatic screen adapted to respond to light reflected from the object and generate two distinct images thereof;

imaging means for focusing the two distinct images generated by the lenticular prismatic screen;

sensor means for detecting the images focused by the imaging means and for providing output signals indicative thereof; and computing means for processing the output signals from the sensor means and for computing the centroid of each of the two distinct images generated by the lenticular prismatic screen to determine the separation between them, which separation is indicative of the distance to the object.

4. Apparatus for determining the relative distance to an object, comprising:

a light source for projecting light at an object whose distance is to be determined;

a plurality of prisms adapted to respond to light reflected from the object and generate two distinct images thereof;

imaging means for focusing the two distinct images generated by the plurality of prisms;

sensor means for detecting the images focused by the imaging means and for providing output signals indicative thereof; and computing means for processing the output signals from the sensor means and determining the separation between the two distinct images generated by the plurality of prisms in response thereto, which separation is indicative of the distance to the object.

5. The apparatus of claim 4 wherein the computing means comprises means for computing the centroid of each of the two distinct images to determine the separation between them, and hence the distance to the object.

6. Apparatus for determining the relative distance to an object, comprising:

a light source for projecting light at an object whose distance is to be determined;

a plurality of prisms adapted to respond to light reflected from the object and generate two distinct images thereof;

imaging means for focusing the two distinct images generated by the plurality of prisms;

sensor means for detecting the images focused by the imaging means and for providing output signals indicative thereof; and computing means for processing the output signals from the sensor means and for computing the centroid of each of the two distinct images generated by the plurality of prisms to determine the separation between them, which separation is indicative of the distance to the object.

* * * * *